Patented Jan. 16, 1934

1,943,650

UNITED STATES PATENT OFFICE 1,943,650

METHOD OF STERILIZING WATER

John C. Baker, Montclair, and Franz C. Schmelkes, Bloomfield, N. J., assignors to Wallace & Tiernan Products, Inc., Belleville, N. J., a corporation of New Jersey No Drawing. Application May 20, 1931
Serial No. 538,866

2 Claims. (Cl. 210—28)

This invention relates to the treatment of water to sterilize the same, and has particular reference to the treatment of city and town water supplies.

The sterilization of water with chlorine or chlorine compounds has been accompanied by a number of difficulties. Chlorine, when added to the water in any excess above the minimum amount required to sterilize, produces a characteristic objectionable taste. This is often referred to as a "chlorinous" taste in water. In addition to this primary taste, other secondary tastes and odors may be produced in the water by the reaction of the chlorine compounds with phenolic and other organic materials, which are present in the water, to produce very undesirable tastes and odors. These tastes and odors are often described as "medicinal", "iodoform", "woody", and "musty", and are developed after the addition of the chlorine. It has been proposed to improve water and eliminate the development of these tastes and odors by the use of mono-chloramine, and this has been tried with considerable success. However, mono-chloramine is a very slow reacting chemical and possesses a very low oxidation potential, so that the period of time required for this compound to achieve sterilization of the water is often too great, usually extending from one-half hour to as long as two to three hours. Many water supplies do not have long enough storage facilities to achieve this period of contact.

It has been discovered that all of the above undesirable results from sterilization with chlorine or mono-chloramine can be overcome by the use of di-chloramine as the sterilizing agent. No tastes are developed from the use of this compound, since water sterilized with di-chloramine does not possess tastes that did not previously exist in the water. Di-chloramine also is rapid in its sterilizing action, sterility being achieved in fifteen minutes in most cases, in contrast to the slow action of mono-chloramine.

The di-chloramine is most conveniently prepared by the reaction of solutions containing available chlorine with solutions containing ammonia or ammonium salts. A suitable process for this purpose is described in Patent No. 1,850,057 of John C. Baker and Franz C. Schmelkes, issued March 15, 1932. Such process is adapted to produce solutions in which over 95% of the available chlorine present is in the form of di-chloramine. Marked advantages are also obtained by the use in water sterilization of solutions in which only 85% of the available chlorine is in the form of di-chloramine, and this percentage may be as low as 50%. If the acidity is properly controlled, the above process will yield only di-chloramine or mixtures of di- and mono-chloramine with substantially no nitrogen trichloride.

The above mentioned process is capable of producing these high proportions of di-chloramine from solutions in which the available chlorine and ammonia or ammonium salts are in substantially theoretical stoichiometrical relation, so that at the completion of the reaction there is at the most only a slight excess of either available chlorine or ammonia or ammonium salts. Hence, not only is 50%, 85% or 95% or more of the chloramine in the form of di-chloramine, but also the greater part of the amine content (including ammonia or ammonium salts as amines) is present in the form of di-chloramine. The process is, therefore, highly economical as regards costs and also has the advantage that it introduces into the water treated a minimum quantity of solid matter.

Usually the di-chloramine is prepared in the form of a solution which is then added to the water to be treated. The di-chloramine is to advantage prepared in relatively weak solutions, say around 0.07%, as such solutions are more stable than solutions of greater strength. On the other hand, weaker solutions involve larger mixing chambers and are more difficult to control as to pH. Usually, therefore, the concentration of di-chloramine in the solution to be added to the water treated should be within the limits of 0.02 and 0.3%. The invention includes, however, the preparation of weaker solutions.

The amounts of chlorine required for the purpose of making the necessary quantities of di-chloramine are substantially the same as are used in ordinary sterilization with chlorine, though lesser amounts may be used and sterilization accomplished. This is because the "chlorine demand" of the water is not as great for di-chloramine as it is for chlorine or hypochlorites.

A further advantage of our process is obtained from this lessened "chlorine demand" for the available chlorine of di-chloramine. When water is sterilized with di-chloramine and a slight excess is used in the water, the "chlorine residual" will remain in the water for longer periods of time, without disappearing. In fact, the residual chlorine in this form can be carried throughout the entire water system and sterility maintained at all points, even to the consumers' outlets. This gives a further great advantage to the process in that organisms do not grow in the water after sterilization and recontaminate the water. Also, if subsequent contamination gets into the water from outside sources after sterilization, the sterilizing reagent is present to kill the contaminating organisms and safety of the water supply is greatly increased.

Further advantage is found in the prevention of development of musty taste in the water mains. In the water mains materials settle out from the water during periods of low flow and form a sludge on the lower surfaces of the pipes. This sludge tends to decompose and give off taste-forming materials. Decomposition of this material is largely biological due to the growth of organisms in the sludge. When di-chloramine is used and carried throughout the system, it tends to keep this material sterile and prevents its decomposition and development of taste. The accumulation of sludge in too great amounts is prevented, of course, by the usual method of flushing out the pipes.

What is claimed is:

1. The method of sterilizing water comprising preparing a solution containing 0.02 to 0.3% of di-chloramine and adding such solution to the water to be treated.

2. The method of sterilizing water comprising preparing a solution containing around 0.07% of di-chloramine and adding such solution to the water to be treated.

JOHN C. BAKER.
FRANZ C. SCHMELKES.